Nov. 15, 1932.  A. L. ALBERTI  1,887,984

TIRE RIM

Filed Jan. 11, 1932  4 Sheets-Sheet 1

Inventor

Angelo L. Alberti

By Clarence A. O'Brien

Attorney

Nov. 15, 1932.  A. L. ALBERTI  1,887,984
TIRE RIM
Filed Jan. 11, 1932  4 Sheets-Sheet 2

Inventor
Angelo L. Alberti

By Clarence A. O'Brien
Attorney

Nov. 15, 1932.    A. L. ALBERTI    1,887,984
TIRE RIM
Filed Jan. 11, 1932    4 Sheets-Sheet 3

Inventor
Angelo L. Alberti
By Clarence A. O'Brien
Attorney

Nov. 15, 1932.　　　A. L. ALBERTI　　　1,887,984

TIRE RIM

Filed Jan. 11, 1932　　　4 Sheets-Sheet 4

Inventor

Angelo L. Alberti

By Clarence A. O'Brien

Attorney

Patented Nov. 15, 1932

1,887,984

UNITED STATES PATENT OFFICE

ANGELO L. ALBERTI, OF BEAVER FALLS, PENNSYLVANIA

TIRE RIM

Application filed January 11, 1932. Serial No. 585,995.

The present invention relates to tire rims for automobiles and particularly to the type made up of a plurality of hingedly connected sections and the object of the invention resides in the provision of means for locking the sections in their circular relationship with one another, means being easy to manipulate, simple in construction, thoroughly efficient and reliable in use and otherwise well adapted to the purpose for which it is designed.

With the above and other objects in view as will appear as the description proceeds, the invention resides in certain novel features of construction, and in the combination and arrangement of parts as will be hereinafter more fully described and claimed.

Figure 1:
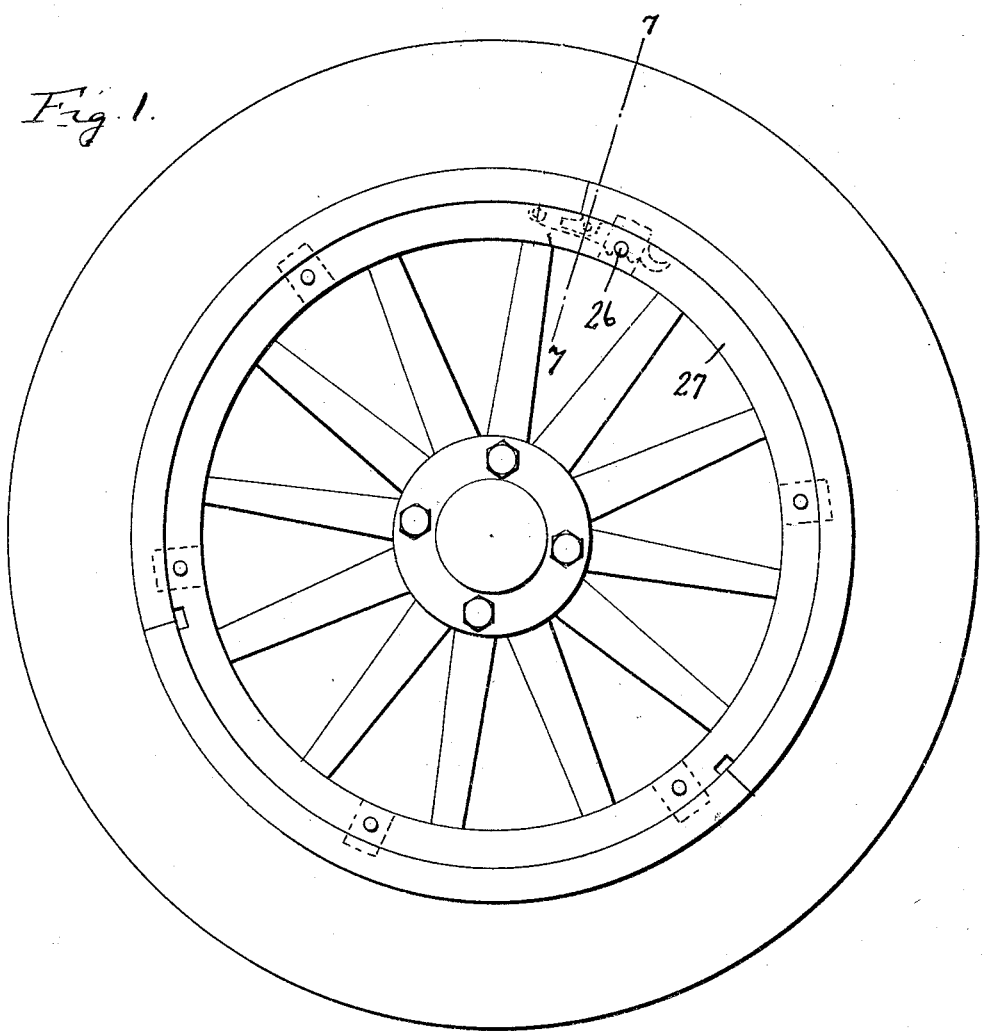
Figure 1 is a side elevation of a vehicle showing my rim structure mounted thereon.

Referring to the drawings in detail it will be seen that the rim is made up of three sections 5, 6 and 7. The sections 6 and 7 are hingedly connected as at 8 to the ends of the section 5.

Numeral 9 denotes the lock lever having a reduced end 10 rockably mounted between a pair of ears 11 adjacent the free end of the section 6. Intermediate the ends of the lever 9 adjacent the end 10 in an oblong opening 12. Opposed transverse openings 14 are provided in the lever opposite the opening 12. The free end of the section 7 is provided with an angular lug 18 extending therefrom and having an end or extension 19 received in the opening 12.

Figure 7:
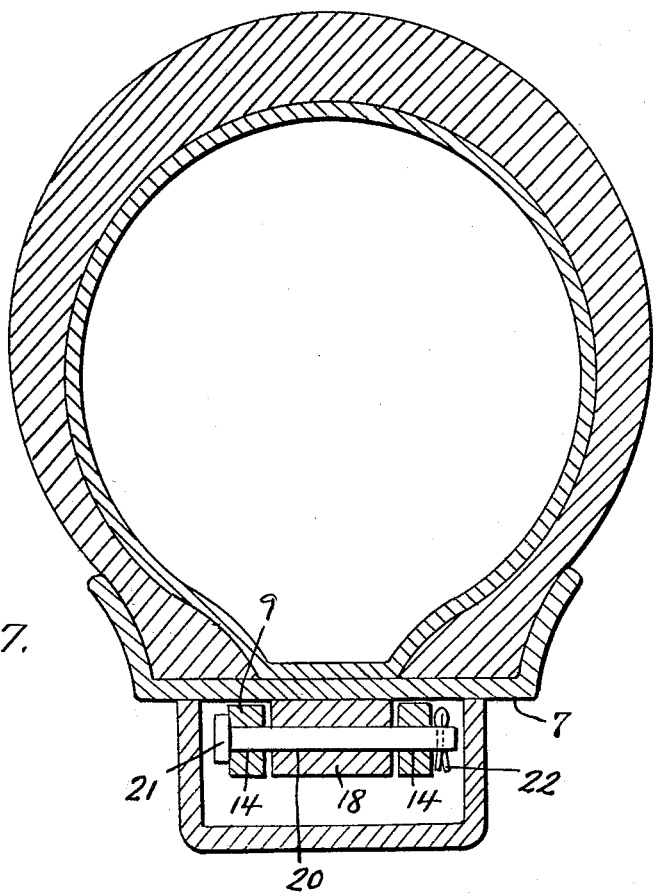
Figure 7 is an enlarged detail section taken on the line 7—7 of Figure 1.
Figure 8:
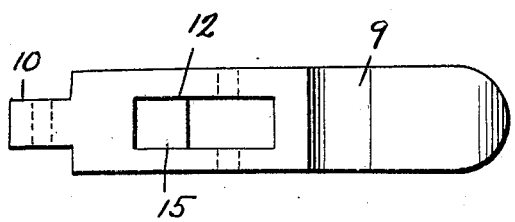
Figure 8 is a plan view of the lock lever.

The lug is provided with a transverse opening 20 to register with the openings 14 so that when the lever is swung to place the lug within the opening 12 pin 21 may be inserted through the openings 14, and opening 20 as clearly illustrated in Figure 7, and held in place against accidental removal by cotter pin 22. This pin 21 thus serves to lock the lever against swinging movement about its pivot. The lever adjacent its free end is provided on its inner side with a notch 25 to receive one of the bolts 26 of the wheel felly 27 so as to prevent circumferential movement of the rim on the felly.

Figure 6:
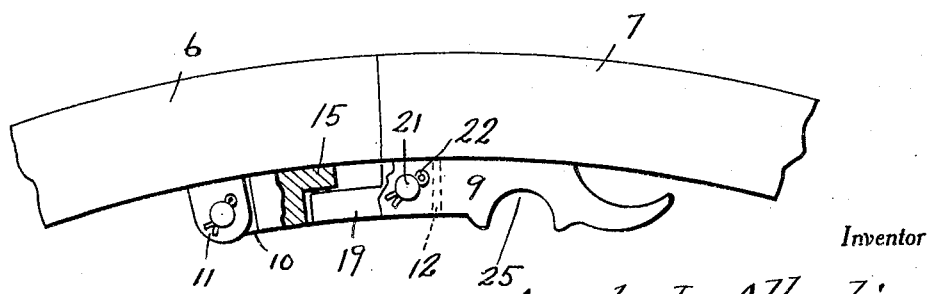
Figure 6 is an enlarged detail side elevational view of the locking means, certain parts being broken away and shown in section.
Figure 2:
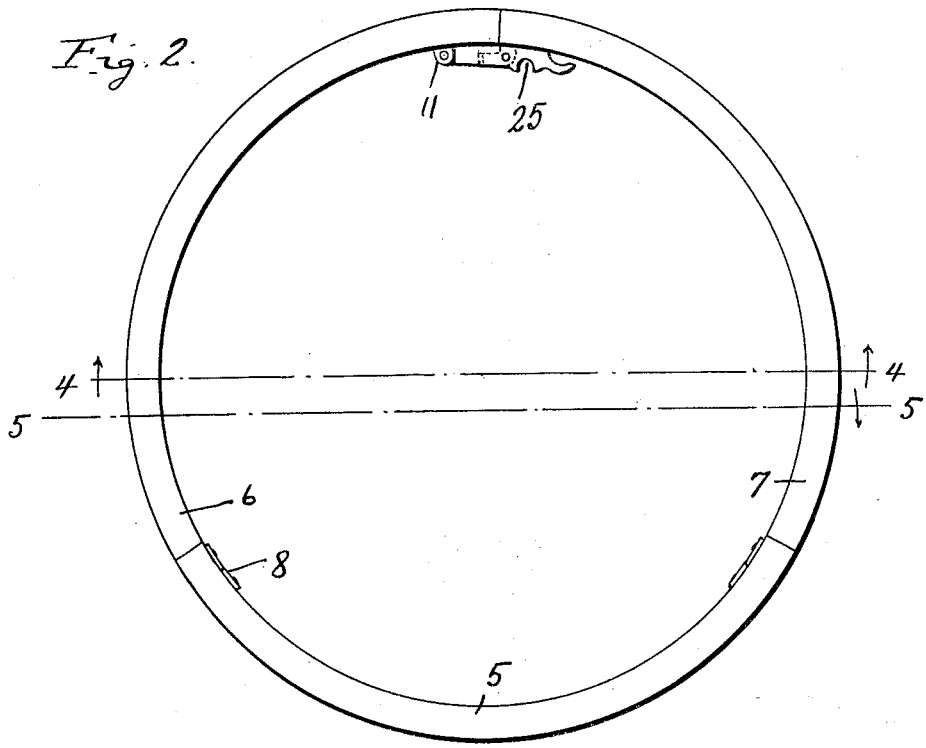
Figure 2 is a side elevation of the rim.
Figure 4:
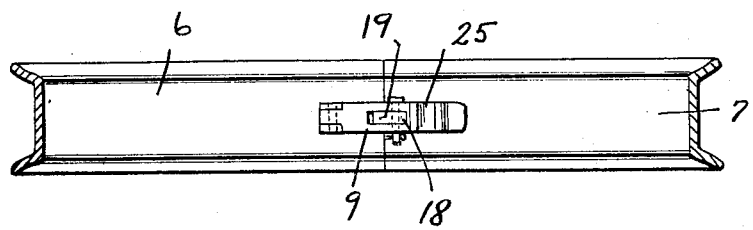
Figure 4 is a sectional view taken substantially on the line 4—4 of Figure 2.
Figure 3:
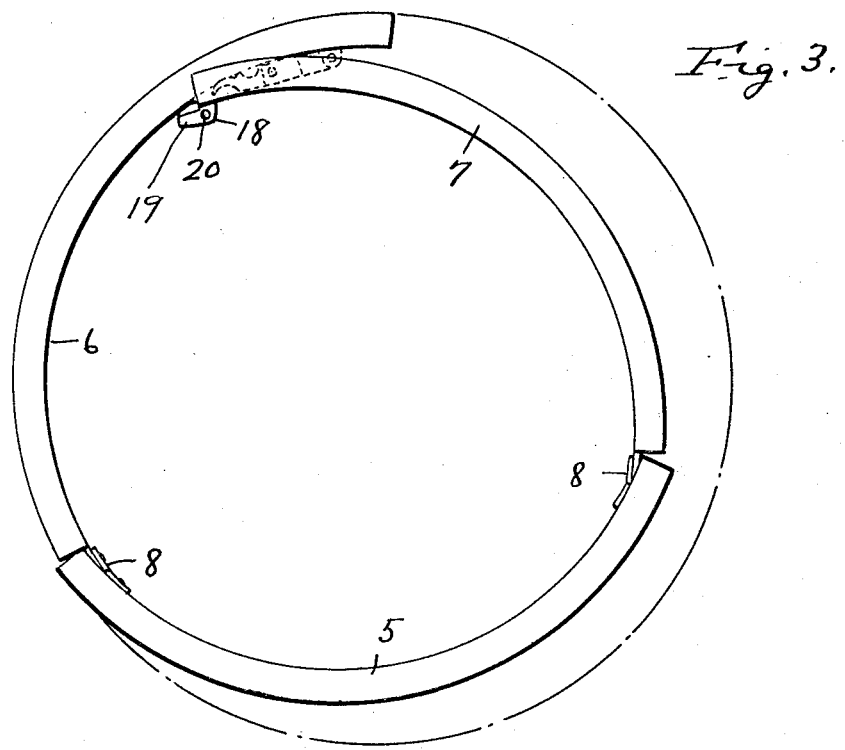
Figure 3 is a similar view showing the rim partially folded.
Figure 5:
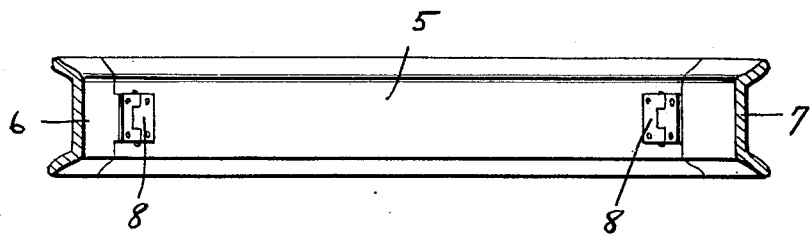
Figure 5 is a sectional view taken substantially on the line 5—5 of Figure 2.

The lever 9 adjacent end 10 is notched to provide an abutment 15 transversing the aperture 12 and arranged to engage lug extension 19 when lever 9 is swung in a clockwise direction from the position shown in Figure 6 to the position shown in Figure 3 engagement of the abutment 15 with the lug extension 19 initiating movement of the rim section 7, thus breaking joint between the sections 6 and 7. In Figure 3 is shown the rim in a fully contracted condition.

It is thought that a clear understanding of the construction and operation of the invention will be apparent from the foregoing, and while I have herein shown what I consider to be a preferred embodiment of the invention, it is to be understood that I do not wish to limit myself to the specific details herein illustrated since in actual practice it may be desirable to resort to slight changes. It is therefore to be clearly understood that I do not wish to restrict the invention other than may be necessary for the requirements of the prior art and the scope of the appended claims.

Having thus described my invention, what I claim as new is:

1. In a sectional tire rim, in combination, an intermediate section, end sections hingedly connected thereto, a lever pivotally connected to one of the end sections and provided with an aperture, a lug on the proximate end of the other end section and insertable in the aperture in the lever, said lug and said lever being provided with registering openings, and a pin extending through said registering openings.

2. In a sectional tire rim, in combination, an intermediate section, end sections hinged thereto, a lever pivotally connected to one of the end sections, an angular lug on the proximate end of the other end section and adapted to be received in an aperture in the lever, and an abutment bridging said aperture and arranged to engage the proximate end of said lug to break joints between the proximate ends of said end sections upon swinging of the lever in one direction.

3. In a sectional tire rim, in combination, an intermediate section, end sections hinged thereto, a lever pivotally connected to one of the end sections, an angular lug on the proximate end of the other end section and adapted to be received in an aperture in the lever, and an abutment bridging said aperture and arranged to engage the proximate end of said lug to break joints between the proximate ends of said end sections upon swinging of the lever in one direction, said lever on its inner side being provided with a notch to receive a felly bolt, and means engaging said lug and said lever for securing the latter against casual displacement.

In testimony whereof I affix my signature.

ANGELO L. ALBERTI.